United States Patent

[11] 3,623,746

[72] Inventor Michael E. Zielinski
    Washington, D.C.
[21] Appl. No. 31,253
[22] Filed Apr. 23, 1970
[45] Patented Nov. 30, 1971
[73] Assignee General Motors Corporation
    Detroit, Mich.

[54] SELF-PUMPING VEHICLE HEIGHT CONTROL ASSEMBLY
    5 Claims, 5 Drawing Figs.
[52] U.S. Cl. .................................................. 280/124,
    222/401
[51] Int. Cl. ...................................................... B60g 17/04
[50] Field of Search .......................................... 280/124 F,
    124, 6; 222/401; 267/65

[56] References Cited
UNITED STATES PATENTS
3,206,185 9/1965 Oldberg ........................ 280/124

Primary Examiner—Philip Goodman
Attorneys—F. J. Soucek and C. R. Engle

ABSTRACT: A pump assembly including a piston attached to the vehicle unsprung mass for reciprocal movement within a cylinder secured to the sprung mass supplies pressure fluid to suspension lift units. Downward movement of the piston draws fluid into the pump assembly from a reservoir and upward movement of the piston compresses the fluid for discharge through a pressure port to the lift units. A pressure relieve valve is provided for dumping the fluid to the reservoir when the lift units are sufficiently pressurized. The pump assembly further includes a balanced control valve operative to bypass fluid from the pressurized lift units back to the reservoir when the vehicle is lightly loaded and blocks flow from the lift to the reservoir when the vehicle is heavily loaded. The balanced valve is biased closed with a spring force varying with movement of the pump piston.

PATENTED NOV 30 1971 3,623,746

INVENTOR
Michael E. Zielinski
BY
C.L. Engle
ATTORNEY

SELF-PUMPING VEHICLE HEIGHT CONTROL ASSEMBLY

This invention relates to an automatic vehicle height leveling control system and more specifically to a pump arrangement containing a balanced control valve automatically responsive to vehicle height.

Many forms o automatic vehicle leveling systems are known in the art. In these systems it is common practice to utilize a pump driven by the engine or by an electric motor to supply pressurized fluid for storage in a separate reservoir. The stored pressurized fluid is supplied to auxiliary vehicle suspension lift units in accordance with the position of a height sensing element attached to a control valve. In such systems it is common practice to either discharge excess pressurized fluid from the auxiliary lift units to atmosphere during excessive suspension height conditions or to incorporate return lines transmitting the pressurized fluid back to the reservoir. A problem common to most of these systems includes the entrance of foreign matter into either the pump or the control valve assembly as debris collects on the undercarriage of the vehicle. In the situation where the pump is either driven by the vehicle engine or via an electrical system, a certain amount of accessory power is consumed. Also it is obvious that the remote placement of the various elements including the spacing of the compressor from the reservoir and in turn the spacing of the reservoir from the control valve requires considerable plumbing. With these considerations in mind the subject invention includes a vehicle suspension self-pumping height control assembly supplying pressurized fluid in response to normal vehicle road movements. The pump assembly includes a balanced control valve which is responsive to vehicle height conditions and is in direct communication with a reservoir secured to the pump housing. In this manner only a minimum of plumbing is required and utilization of movement between the sprung and unsprung masses to provide the pressurized fluid eliminates use of accessory energy.

Accordingly among the objects of this invention is the provision of a pump assembly responsive to movement between the sprung and unsprung masses for supplying pressurized fluid to auxiliary suspension lift units under the regulation of a balanced control valve mounted within the pump housing.

A further object of the present invention is to simplify automatic vehicle leveling by including a height adjusting hydraulic lift unit of the piston-cylinder type in series with a main suspension coil spring between the vehicle chassis and its rear axle housing and by including an integral pump and reservoir assembly between the chassis and axle to supply fluid to the lift unit in response to vehicle road movements.

A still further object of this invention is the provision of a self-pumping automatic suspension leveling height control assembly requiring only a single conduit from the assembly to each of a pair of auxiliary lift units.

Yet another object of this invention is the provision of a pump assembly responsive to relative movement between the sprung and unsprung vehicle masses continually supplying pressurized fluid to auxiliary lift units wherein the supply of pressurized fluid is subject to the control of a balanced valve located within the pump assembly and responsive to fluid pressures and suspension heights indicative of vehicle load.

A still further object of this invention is the provision of a self-pumping vehicle suspension height control assembly including a piston reciprocating within a pump housing, the piston having a recessed upper surface supporting a telescoping spring limiter assembly which upon sufficient extension of the piston occurring during light vehicle loads disengages a balance control valve permitting a biasing spring to open the valve and provide for reverse flow of fluid from the lift units to a reservoir integral with the pump housing.

In order to attain the aforementioned objects of the present invention, one working embodiment includes auxiliary fluid spring lift units concentrically located within primary suspension coil springs and mounted adjacent the ends of a rear axle assembly between a control arm and the vehicle frame. A pump assembly responsive to relative movement between the vehicle sprung and unsprung masses has one end secured to the control arm adjacent one of the primary suspension units and comprises a pressure discharge port connected to the adjacent auxiliary lift unit and the similar lift unit positioned at the other end of the rear axle assembly. A single line connects the discharge port with both of the lift units and conducts fluid to and from the units as required. The pump assembly includes a balanced control valve in fluid connection with the pressure discharge port whereby the pump pressurized fluid is normally transmitted to the auxiliary lift units to maintain a constant suspension height. When the vehicle is lightly loaded or a portion of the vehicle load is removed the suspension height increases, extending the piston within the pump housing assembly. Sufficient extension of the piston results in expansion of a spring limiter assembly removing the bias force of a compression spring allowing the balanced control valve to move open. This allows reverse flow of fluid from the lift units to a reservoir integral with the pump housing assembly. As the lift units exhaust pressurized fluid back through the pump assembly to the reservoir, the suspension height decreases until the spring limiter retracts and the compression spring again applies a closing biasing force to the balanced control valve.

Further objects and advantages of the present invention will be apparent from the following description, reference being had to the accompanying drawings wherein a preferred embodiment of the present invention is clearly shown.

Figures 1, 2, 3, 4, 5:
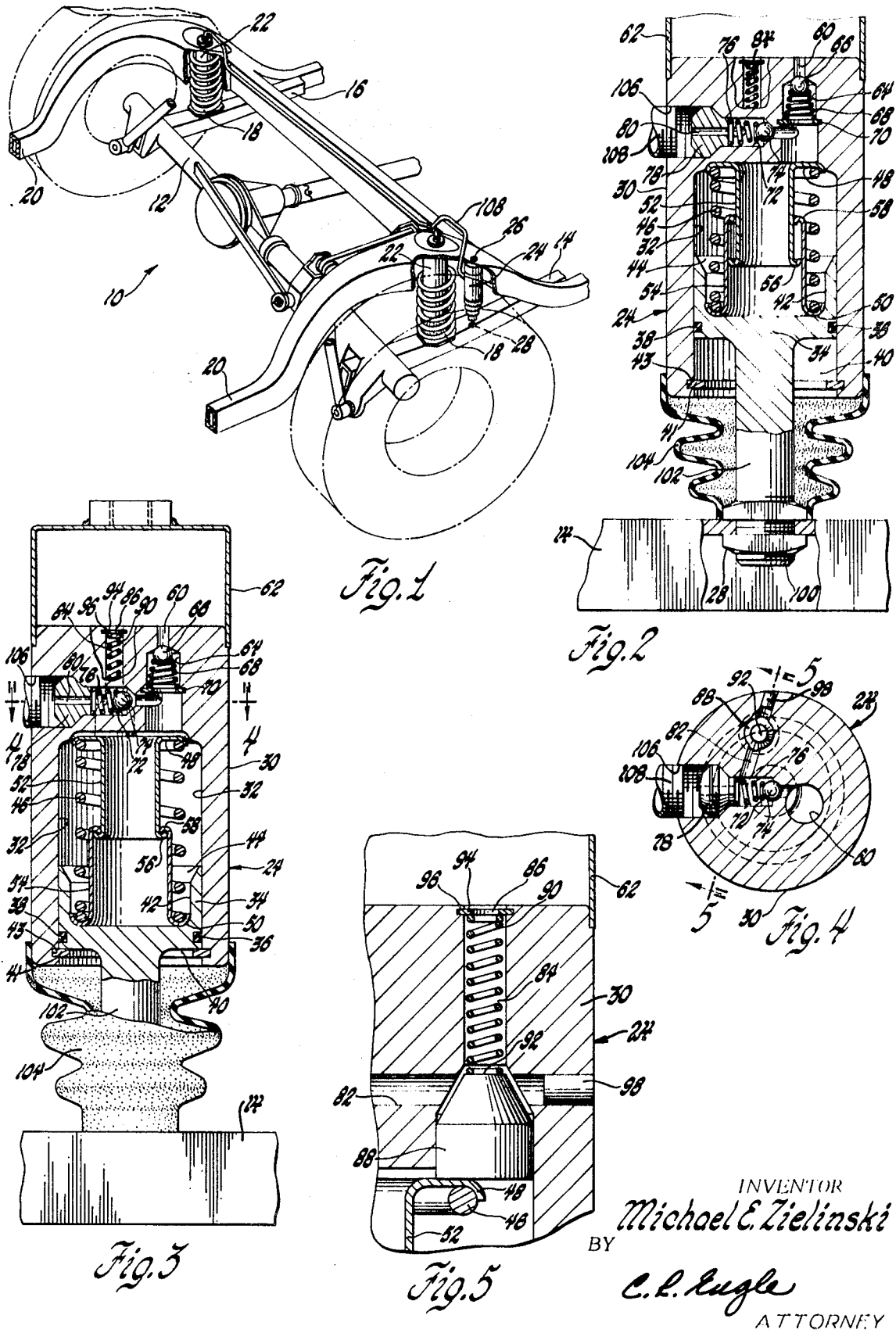
FIG. 1 is a perspective view, partially broken away, illustrating a vehicle rear suspension system including the self-pumping vehicle height control assembly of the present invention.
FIG. 2 is a cross-sectional view of the self-pumping vehicle height control assembly illustrating the piston rod being secured to the suspension control arm and the piston being partially retracted within the housing.
FIG. 3 is a cross-sectional view of the self-pumping vehicle height control assembly illustrating the piston in its extended position and the attachment of a reservoir to the pump housing.
FIG. 4 is a sectional view taken on lines 4—4 of FIG. 3 illustrating the placement of the balanced control valve relative to the pump discharge port.
FIG. 5 is a partial sectional view taken on lines 5—5 of FIG. 4 to more clearly illustrate the details of the balanced control valve.

Referring now to FIG. 1, a vehicle rear suspension system 10 includes an unsprung mass in the form of a rear axle housing 12 having control arms 14 and 16 located adjacent each end thereof. Primary suspension coil springs 18 are mounted upon each of the control arms 14 and 16 and are in engagement with a sprung mass in the form of vehicle frame 20 thereby providing a major portion of the support between the rear axle housing 12 and the frame 20 during operation of the vehicle. Concentrically disposed within the coil springs 18 are auxiliary fluid lift units 22 which are also secured to the control arms 14 and 16 at their lower ends and are secured to the frame 20 at their upper ends.

A self-pumping suspension height control assembly 24 is secured to the frame at 26 and is ether in engagement with control arm 14 or is secured thereto by the threaded fastening assembly 28 illustrated in FIG. 2.

The self-pumping height control assembly 24 comprises a pump housing 30 containing a cylinder bore 32 slidably receiving a piston 34. The piston 34 is machined to contain an angular groove 36 containing a seal 38 preventing leakage of pressure fluid through end 40 of the pump housing 30. Withdrawal of piston 34 from the housing 30 is prevented by spring washer 41 mounted in annular groove 43. The piston 34 is prevented by spring washer 41 mounted in annular groove 43. The piston 34 also is machined to contain a counterbored recess 42 in its upper surface 44 receiving and positioning the compression spring 46. The compression spring 36 is in engagement with annular flanges 48 and 50 of telescoping spring limiter sleeve members 52 and 54 for a purpose later to be described. The relative extensive movement of the spring limiters 52 and 54 is limited by the engagement of flanges 56 and 58 formed at their inner ends. The upper end of the pump housing 30 contains an inlet port 60 which receives fluid from a source such as the attached reservoir 62, shown in FIG. 3, through a passage 64 containing a ball check valve 66 biased closed by a conically shaped coil spring 68 retained in the pump housing 30 by means of a spring washer 70. The reservoir 62 in this embodiment has a threaded boss thereon for attaching the housing 30 to frame 20. A pressure discharge passage 72 connects with inlet passage 64 and likewise contains a ball valve 74 biased closed by a conical coil spring 76 engaging one end of a press fit bushing 78 defining a metering passage 80.

Referring now to FIGS. 4 and 5, the pressure discharge passage 72 in housing 30 also connects with a laterally extending passage 82 which connects with a vertical exhaust passage 84 connecting with a dump port 86 as best shown in FIG. 5. The flow of fluid through passage 82 is regulated by a balanced control valve 88, which is biased toward an open position by a coil spring 90 engaging the top surface 92 of the valve 88 and a spring washer 94 positioned in an annular groove 96 in the pump housing 30. The valve 88 is biased to a closed position via engagement of the annular flange 48 of the spring loader sleeve 52 which is biased into engagement therewith by compression spring 46. The portion of passage 82 down stream of valve 88 is blocked by a plug member 98 press fit into the passage to prevent leakage to the exterior of pump housing 30. The terminal end 100 of piston rod 102 is shown secured to control arm 14 by means of the threaded connection 28 as illustrated in FIG. 2 and is enclosed by a flexible boot seal assembly 104 to prevent the entrance of foreign matter within the cylinder bore 32. It is apparent that the terminal end 100 of rod 102 is only required to engage the upper surface of the control arm 14 for sensing relative movement between the control arm 14 and the frame 20 to provide an indication of existing height between the vehicle sprung and unsprung masses.

In operation, vehicle road movements displace the vehicle frame 20 with respect to rear axle assembly 12 extending and retracting piston 34 within cylinder bore 32 in the pump housing 30. Extending movement of the piston draws fluid from reservoir 62 through intake port 60 and past check valve 66 into the bore 32, while retracting movement of the piston pressurizes the fluid for discharge through passage 72 simultaneously assisting spring 68 in biasing ball valve 66 closed. The pressurized fluid is metered through passage 80 and exits discharge port 106 from where it is conducted to auxiliary lift units 22 through a conduit 108. The pressurized fluid is continuously supplied through the conduit 108 during vehicle operation providing a ready source to maintain the lift units 22 sufficiently extended subject to regulation of the balanced control valve 88 providing a desired suspension height.

When all or a portion of the vehicle load is removed, the piston 34 extends within the cylinder bore 32 expanding spring 46 and providing a clearance between the flange 48 and valve 88 so that spring 90 is operative to unseat valve 88 as illustrated in FIG. 5. In this condition a reverse flow occurs and the pressurized fluid flows from the lift units 22 through conduit 108 to the pressure discharge port 106 from where it passes through metering passage 80 into passage 72 and is directed through passage 82 around valve 88 upwardly through passage 84 and outwardly of dump port 86 into the reservoir 62. Ball valve 74 prevents flow into inlet passage 60. This condition will continue until the flange 48 of the spring limiter 52 again engages the lower surface of control valve 88 and the force of compression spring 46 overcomes that of spring 90 again seating the control valve 88 in a closed position.

From the above description it is apparent that this arrangement provides a self-pumping automatic vehicle suspension leveling arrangement wherein deflections occurring during normal operation of the vehicle are utilized to actuate a pump supplying pressurized fluid to auxiliary suspension lift units. Integral with the pump assembly is a balanced control valve responsive to the position of the piston within the pump housing thereby measuring vehicle suspension heights. Excessive heights open the control valve to exhaust pressurized fluid from the lift units back to an integral reservoir or connected reservoir. When the pressure becomes excessive in the lift units for one reason or another, the control valve 88 is biased open by the fluid pressure and spring 90 against the force of spring 46 allowing the valve 88 to also act as a pressure relief valve. While the pump assembly is continuously in operation in supplying pressurized fluid it is obvious that it requires little energy for such operation and specifically does not utilize any accessory drive or create a drain on the electrical system. It is further significant that this assembly includes the integral control valve feature in conjunction with an attached reservoir thereby reducing the plumbing in the system to an absolute minimum as only a single conduit both supplies and exhausts the fluid. Another significant feature of the invention resides in the fact that the assembly can be mounted at any point on the vehicle where it is responsive to movement between the sprung and unsprung masses creating the pumping energy.

While a preferred embodiment of the present invention has been shown and described, it is readily appreciated that various modifications and substitutions may be made without departing from the spirit of this invention which is intended to be limited only within the scope of the appended claims.

I claim:

1. In an automatic vehicle suspension leveling system of the type having fluid actuated lift units supplied with pressure fluid maintaining a constant suspension height between the sprung and unsprung masses as required by variance in vehicle load the improvement comprising; a pump housing including a cylinder, said housing being secured for movement with the sprung mass, a piston reciprocating within the cylinder, a piston rod secured to said piston and being movable with the unsprung mass, a pressure fluid discharge passage in fluid connection with an inner portion of said cylinder, an inlet passage connecting with an inner portion of said cylinder, a check valve assembly in said inlet passage preventing flow outwardly of said pump housing, a balanced control valve in fluid connection with said pressure fluid discharge passage, first means engaging said piston and said control valve biasing said balanced control valve closed while the fluid-actuated lift units are being supplied pressure fluid as said piston moves into said cylinder in response to road deflections, and second means biasing said balanced control valve open when said piston and said lift units are extended beyond a normal suspension height and said first means is ineffective to bias said control valve closed whereby pressure fluid reverse flows from said lift units through said pump housing until the normal suspension height is again obtained.

2. In an automotive vehicle suspension leveling system of the type having fluid-actuated lift units supplied with pressure fluid maintaining a constant suspension height between the vehicle sprung and unsprung masses in response to a vehicle load the improvement comprising; a pump housing including a cylinder, said housing being secured for movement with the sprung mass, a piston reciprocating within the cylinder, a piston rod secured to said piston and being movable with the unsprung mass, a pressure fluid discharge passage in connection with an inner portion of said cylinder, a reservoir secured to said pump housing an inlet passage connecting said reservoir secured to said pump housing, an inlet passage connecting said reservoir with an inner portion of said cylinder, a check valve in said inlet passage preventing flow outwardly of said pump housing into said reservoir, an exhaust passage in said pump housing connecting said discharge passage with said reservoir, a balanced control valve in fluid connection with fluid in said pressure fluid discharge passage controlling flow therethrough, first means engaging said piston and said control valve biasing said balanced control valve closed while the fluid-actuated lift units are being supplied pressure fluid as said piston reciprocates in said cylinder in response to normal road deflections, and second means biasing said balanced control valve open when said lift units and said piston are extended beyond a normal suspension height whereby pressure fluid reverse flows from said lift units through said pressure fluid discharge passage and said exhaust passage into said reservoir until the normal vehicle suspension height is again obtained.

3. A self-pumping vehicle height control assembly of the type operable in response to road deflections to supply pressurized fluid to lift units operating in conjunction with primary coil suspension springs automatically maintaining the suspension height at a constant distance regardless of vehicle load comprising a pump housing including a cylinder, said housing being secured for movement with the vehicle sprung mass, a piston reciprocating within the cylinder, a piston rod secured to said piston and being movable with the vehicle unsprung mass, a pressure fluid discharge passage in said pump housing in fluid connection with an inner portion of said cylinder, a reservoir secured to said pump housing, an inlet passage connecting said reservoir with an inner portion of said cylinder, a check valve in said inlet passage preventing flow outwardly from said pump housing into said reservoir, an exhaust passage in said pump housing connecting said discharge passage with said reservoir, a balanced control valve in fluid connection with said pressure fluid discharge passage controlling flow through said exhaust passage, a first coil compression spring mounted in said piston and biasing said balanced control valve closed while the fluid actuated units are being supplied pressure fluid as said piston reciprocates in said cylinder in response to road deflections, a spring limiter member concentrically located within said first compression spring and being biased into engagement with said balanced control valve by said coil spring, and a second coil spring biasing said balanced control valve toward an open position and being located within a portion of said exhaust passage, said second spring being operative to open said balanced control valve when said lift units and said piston are extended beyond a normal suspension height removing the biasing force of said first spring from said control valve whereby pressure fluid reverse flows from said lift units through said pump housing into said reservoir until the normal suspension height is again obtained.

4. A self-pumping vehicle height control assembly as described in claim 3 wherein said spring limiter comprises a first sleeve having a first annular flange engaged by one end of said first compression spring, a second sleeve positioned for slidable movement over the exterior surface of said first sleeve and having a first annular flange engaged by the other end of said first coil compression spring, a second annular flange on said first sleeve positioned within said second sleeve, and a second annular flange on said second sleeve positioned exteriorly of said first sleeve and formed to engage the second flange of said first sleeve within the second sleeve thereby limiting expansive movement of the spring limiter assembly as the two sleeves are biased apart by said first coil compression spring.

5. A self-pumping vehicle height control assembly of the type operable in response to road deflections to supply pressurized fluid to suspension lift units operating in conjunction with primary coil suspension springs to automatically maintain the suspension height at a constant distance regardless of vehicle load comprising a pump housing including a cylinder, said housing being secured for movement with the vehicle sprung mass, a piston reciprocating within the cylinder a piston rod secured to said piston and being movable with the vehicle unsprung mass, a pressure fluid discharge passage in said pump housing in fluid connection with an inner portion of said cylinder, a reservoir secured to one end of the pump housing, an inlet passage connecting said reservoir with the inner portion of said cylinder, a check valve in said inlet passage preventing flow outwardly from said pump housing into said reservoir, an exhaust passage in said pump housing connecting said discharge passage with said reservoir, said pressure discharge passage connecting with said inlet passage, a check valve assembly positioned in said pressure discharge passage biased to a closed position to prevent reverse flow from said pressure discharge passage biased to a closed position to prevent reverse flow from said pressure discharge passage into said inlet passage, a bushing containing a metering orifice secured in said discharge passage metering the flow of pressurized fluid to said lift units, a balanced control valve in fluid connection with said pressure discharge passage controlling flow through said exhaust passage, a first coil compression spring biasing said balanced control valve closed while the fluid actuated lift units are being supplied pressure fluid as said piston reciprocates in said cylinder in response to road deflections, a spring limiter assembly concentrically located within said compression spring in being biased into engagement with said balanced control valve, said spring limiter assembly comprising a first sleeve telescopingly received within a second sleeve, annular flanges on the outer ends of said sleeves engaged by said spring whereby said spring tends to bias the respective sleeves apart, stop flanges on the inner ends of said sleeves engaging as said compression spring expands limiting the expansive movement thereof, an annular recess in the upper surface of said piston receiving and supporting a portion of said first coil compression spring and said second sleeve member, and a second coil spring biasing said balanced control valve toward an open position and being located within a portion of said exhaust passage, said second spring being operative to open said balanced control valve when said lift units are extended and said piston moves to an extended position within said cylinder whereupon said spring limiter assembly prevents further expansion of said first coil compression spring and said spring limiter assembly is moved out of engagement with said control valve, the opening of said balanced control valve allowing reverse flow from said lift units through said pump housing into said reservoir until said compression spring and limiter assembly again closes said control valve when the desired suspension height is obtained, said balanced control valve acting as a relief valve when excessive pressures occur in said pressure discharge passage and said lift units.

* * * * *

PO-1050
(5/69)

UNITED STATES PATENT OFFICE
CERTIFICATE OF CORRECTION

Patent No. 3,623,746      Dated November 30, 1971

Inventor(s) Michael E. Zielinski

It is certified that error appears in the above-identified patent and that said Letters Patent are hereby corrected as shown below:

Column 1, line 7, "o" should be -- of --;
Column 2, line 33, "FIG. 2" should be the start of a new paragraph;
Column 2, line 61, "ether" should be -- either --;
Column 2, lines 70 and 71, delete "is prevented by spring washer 41 mounted in annular groove 43. The piston 34";
Column 2, line 74, "36" should be -- 46 --;
Column 4, line 66, "housing" should be -- housing, --;
Column 4, line 67 and 68, delete "secured to said pump housing, an inlet passage connecting said reservoir"; and
Column 6, line 20 and 21, delete "biased to a closed position to prevent reverse flow from said pressure discharge passage".

Signed and sealed this 4th day of July 1972.

(SEAL)
Attest:

EDWARD M. FLETCHER, JR.
Attesting Officer

ROBERT GOTTSCHALK
Commissioner of Patents